(12) United States Patent
Ababri et al.

(10) Patent No.: US 12,452,178 B2
(45) Date of Patent: Oct. 21, 2025

(54) SYSTEMS AND METHODS FOR ESTABLISHING LOCAL AREA NETWORK LINKS FOR DEVICES BASED ON QUALITY OF SERVICE

(71) Applicant: Verizon Patent and Licensing Inc., Basking Ridge, NJ (US)

(72) Inventors: Zainab Ababri, Dallas, TX (US); Ratul K. Guha, Warwick, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 18/296,609

(22) Filed: Apr. 6, 2023

(65) Prior Publication Data

US 2024/0340243 A1 Oct. 10, 2024

(51) Int. Cl.
*H04L 47/10* (2022.01)
*H04L 47/20* (2022.01)
*H04L 47/2441* (2022.01)
*H04L 47/2483* (2022.01)

(52) U.S. Cl.
CPC .............. *H04L 47/13* (2013.01); *H04L 47/20* (2013.01); *H04L 47/2441* (2013.01); *H04L 47/2483* (2013.01)

(58) Field of Classification Search
None
See application file for complete search history.

(56) References Cited

U.S. PATENT DOCUMENTS

2023/0422085 A1* 12/2023 Babbellapati ..... H04W 28/0268
2024/0259260 A1*  8/2024 Mindel ................. H04W 24/02

\* cited by examiner

*Primary Examiner* — Anh Ngoc M Nguyen

(57) ABSTRACT

In some implementations, a customer premises equipment (CPE) may determine a category associated with a device in a local area network (LAN), wherein the category is based on a quality of service (QOS) requirement associated with the device. The CPE may establish a LAN link with the device based on the category. The CPE may receive a user equipment route selection policy (URSP) rule for a network slice associated with the category. The CPE may establish a wireless wide area network (WWAN) link to a network node based on the URSP rule, wherein the WWAN link is based on the network slice and a QoS flow identifier associated with the category.

20 Claims, 8 Drawing Sheets

| Device Type | Device IP | Device MAC address | WiFi RSSI | Category | Mapping to priority | Mapping to WiFi QoS Access Category | WMM user priority |
|---|---|---|---|---|---|---|---|
| Gaming Console | 10.0.0.3 | xx.xx.xx.xx | -87 dBm | Latency sensitive | URSP for low latency slice | AC_VO | 7 |
| Smart TV | 10.0.0.4 | xx.xx.xx.xx | xx | High speed | URSP for high speed slice | AC_VI | 5 |
| IoT device | x.x.x.x | xx.xx.xx.xx | xx | Best effort | URSP for default slice | AC_BE | 1 |
| Phone / tablet | x.x.x.x | xx.xx.xx.xx | xx | Multi category | URSP for default slice | Depends on DSCP or MSCS | |

FIG. 5

SYSTEMS AND METHODS FOR ESTABLISHING LOCAL AREA NETWORK LINKS FOR DEVICES BASED ON QUALITY OF SERVICE

BACKGROUND

A customer premises equipment (CPE) is a device that is located at a customer's premises. The CPE may be connected to a carrier telecommunications circuit at a demarcation point. The demarcation point may be a point established in a building to separate customer equipment from equipment associated with a communications service provider. The CPE may be a router, a network switch, a set-top box, or a similar type of device. The CPE may enable a customer to access communication services provided by a service provider and distribute such communication services within a local area network (LAN).

BRIEF DESCRIPTION OF THE DRAWINGS

FIG. 5 is a table for a fifth generation (5G) and WiFi priority mapping at a device level

DETAILED DESCRIPTION OF EXAMPLE EMBODIMENTS

The following detailed description of example implementations refers to the accompanying drawings. The same reference numbers in different drawings may identify the same or similar elements.

A CPE in a LAN (e.g., a WiFi network) may be equipped with a quality of service (QoS) management. The QoS management for the CPE may rely on shaping traffic within an area (e.g., a residential area) based on an available bandwidth. The available bandwidth may be divided between different applications that are running on one or more devices connected to the CPE. For example, the available bandwidth may be split between a video conferencing application and a smart television.

The CPE may share the available bandwidth between the different applications, without regard to a relative importance between the different applications, such that a customized QoS per application and/or device is not achieved. For example, a gaming device may require only a low latency service, a smart television may require a high speed Internet, and an Internet of Things (IoT) device may only need stable connectivity. The CPE may only apply QoS management that is based on the available bandwidth, and not per application and/or device, even though different applications may be associated with different requirements. For example, a video call for an office meeting of a user may not be prioritized over casual movie streaming of another user, because the QoS management for the CPE may not be able to distinguish between different applications and/or devices. Although QoS may be enabled on a telecommunications network side (e.g., a fifth generation (5G) wireless network side), refraining from enabling QoS on a LAN side (e.g., a WiFi side) may result in a sub-optimal performance of the different applications and/or devices connected to the CPE.

Figure 1:
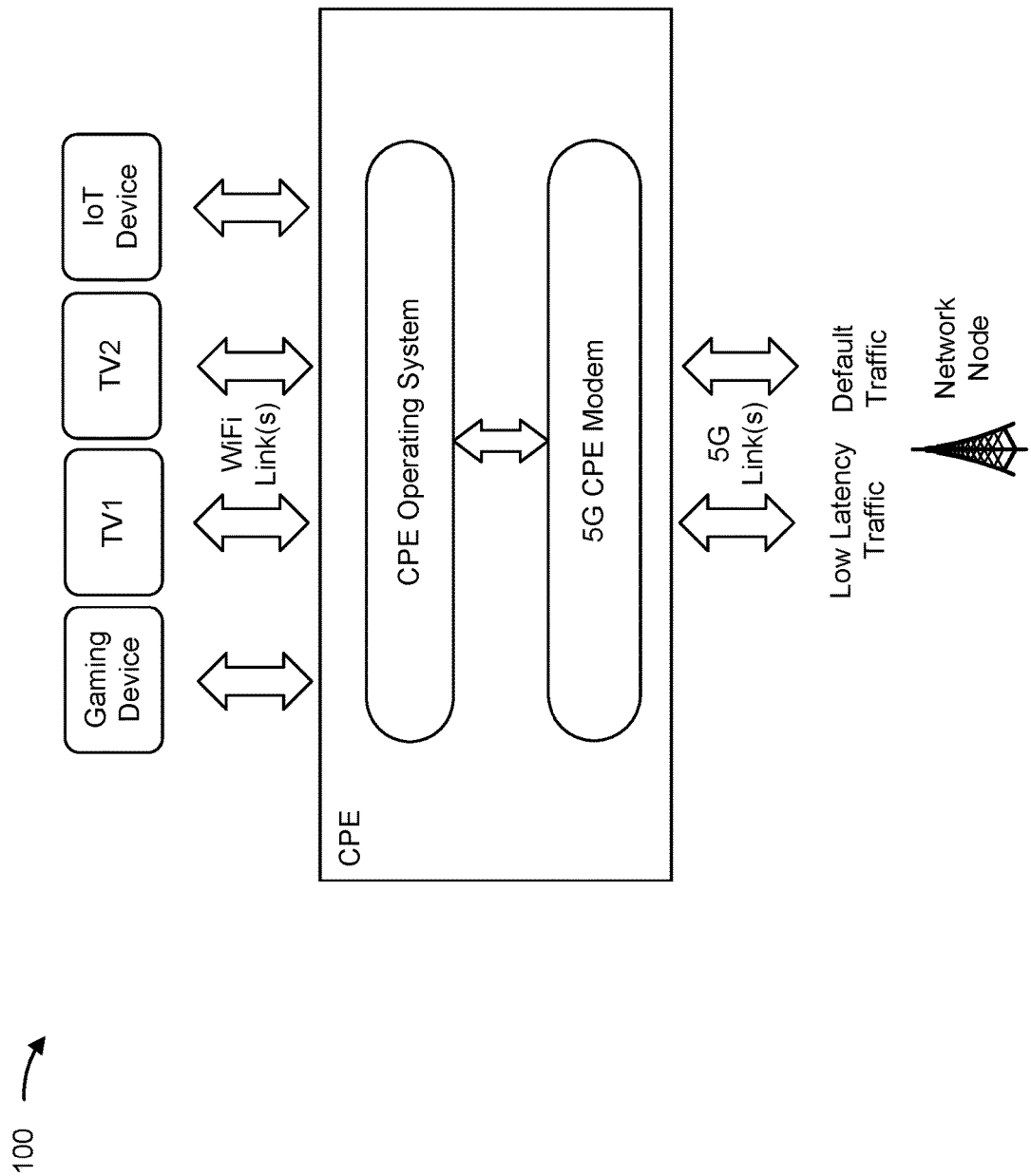
FIG. 1 is a diagram of an example associated with establishing local area network (LAN) links for devices based on quality of service (QOS).

FIG. 1 is a diagram of an example 100 associated with establishing LAN links for devices based on QoS. As shown in FIG. 1, example 100 includes a plurality of devices (e.g., a gaming device, a first smart television, a second smart television, and an IoT device), a CPE, and a network node.

As shown in FIG. 1, the CPE may communicate with the plurality of devices within a LAN. For example, the plurality of devices may communicate with the CPE via respective WiFi links. The CPE may include a CPE operating system and a wireless modem, such as a 5G CPE modem. The 5G CPE modem may establish one or more 5G links with the wireless network node. The one or more 5G links may be for different types of traffic, such as low latency traffic and/or default traffic.

One problem with this approach is that the plurality of devices may be associated with the same QoS by the CPE in the LAN, even when different devices are associated with different QOS requirements. For example, the WiFi links for the gaming device, the first smart television, the second smart television, and the IoT device may be associated with the same QoS, even though the gaming device and the first smart television may be associated with low latency traffic and the second smart television and the IoT device may be associated with default traffic. In other words, the gaming device and the first smart television may require a low latency QoS setting and the second smart television and the IoT device may require a default QoS setting, but each of the devices may be treated the same in terms of the QoS management by the CPE. As a result, the performance associated with the gaming device and the first smart television, which are associated with the low latency traffic, may be degraded.

As indicated above, FIG. 1 is provided as an example. Other examples may differ from what is described with regard to FIG. 1.

In some implementations described herein, a CPE may determine a category associated with a device (or one or more devices) in a LAN, such as a WiFi network. For example, the device may be a gaming device, a smart television, an IoT device, a mobile phone, or any other suitable device. The category may be based on a QoS requirement associated with the device. For example, the QoS requirement may be associated with latency sensitivity, high speed, stable connectivity, and so on. The CPE may establish a LAN link (e.g., WiFi link) with the device based on the category. The LAN link may be based on the QoS requirement associated with the device. In some cases, the CPE may establish one or more LAN links for the one or more devices, respectively. The CPE may receive a user equipment route selection policy (URSP) rule for a network slice associated with the category. For example, the URSP rule may be for a low latency network slice, the URSP rule may be for a high speed network slice, or the URSP rule may be for a default network slice. The CPE may establish a wireless wide area network (WWAN) link (e.g., a 5G link) to the network node based on the URSP rule. The WWAN link may be based on the network slice and a QoS flow identifier, such as a 5G QoS flow identifier (5QFI), associated with the category.

In some implementations, the device in the LAN, or an alternative device in the LAN, may be equipped with an application associated with configuring a QoS management for the LAN. During an initial configuration, which may be triggered by a customer, the application may detect the one or more devices and/or applications connected to the LAN. For example, the application may detect all smart devices connected to a home WiFi network. The application may categorize different devices and/or applications based on QoS needs associated with the different devices and/or applications. The application may allow a customer-initiated categorization of the different devices and/or applications. For example, the application may provide an interface that displays a list of the different devices and/or applications connected to the LAN, and the interface may provide an ability to drag and drop different devices and/or applications into different buckets. The different buckets may include a bucket for high speed, a bucket for low latency, a bucket for high bandwidth, and/or a bucket for consistent connectivity. The application may indicate, to the CPE, a categorization of the different devices and/or applications in the LAN. Alternatively, the CPE may perform a hypertext transfer protocol (HTTP) grabbing and subsequent keyword analysis to identify the different devices and/or applications, and then categorize the different devices and/or applications based on an internal CPE directory. After the categorization is available, URSP rules may be provisioned to the CPE by the WWAN. Connections triggered per each device and/or application in each category may be set up with an appropriate QoS flow identifier and network slice to allow an optimal user experience.

In some implementations, each device and/or application associated with a fixed wireless access (FWA) LAN link (e.g., WiFi link) may be associated with a separate QoS management, depending on a QoS need of that specific device and/or application. Some devices and/or applications may thus be given bandwidth priority over other devices and/or applications on the FWA LAN link, depending on different device/application QoS needs. As a result, QoS management may be enabled on both a WWAN side (e.g., a 5G side) and the FWA LAN link, thereby improving an overall performance of the device and/or application. Otherwise, when QoS management is only enabled on the WWAN side and not on the FWA LAN link, an available bandwidth associated with the LAN may not be allocated appropriately between devices and/or applications of greater priority, thereby impacting a performance of devices and/or applications of greater priority.

Figure 2:
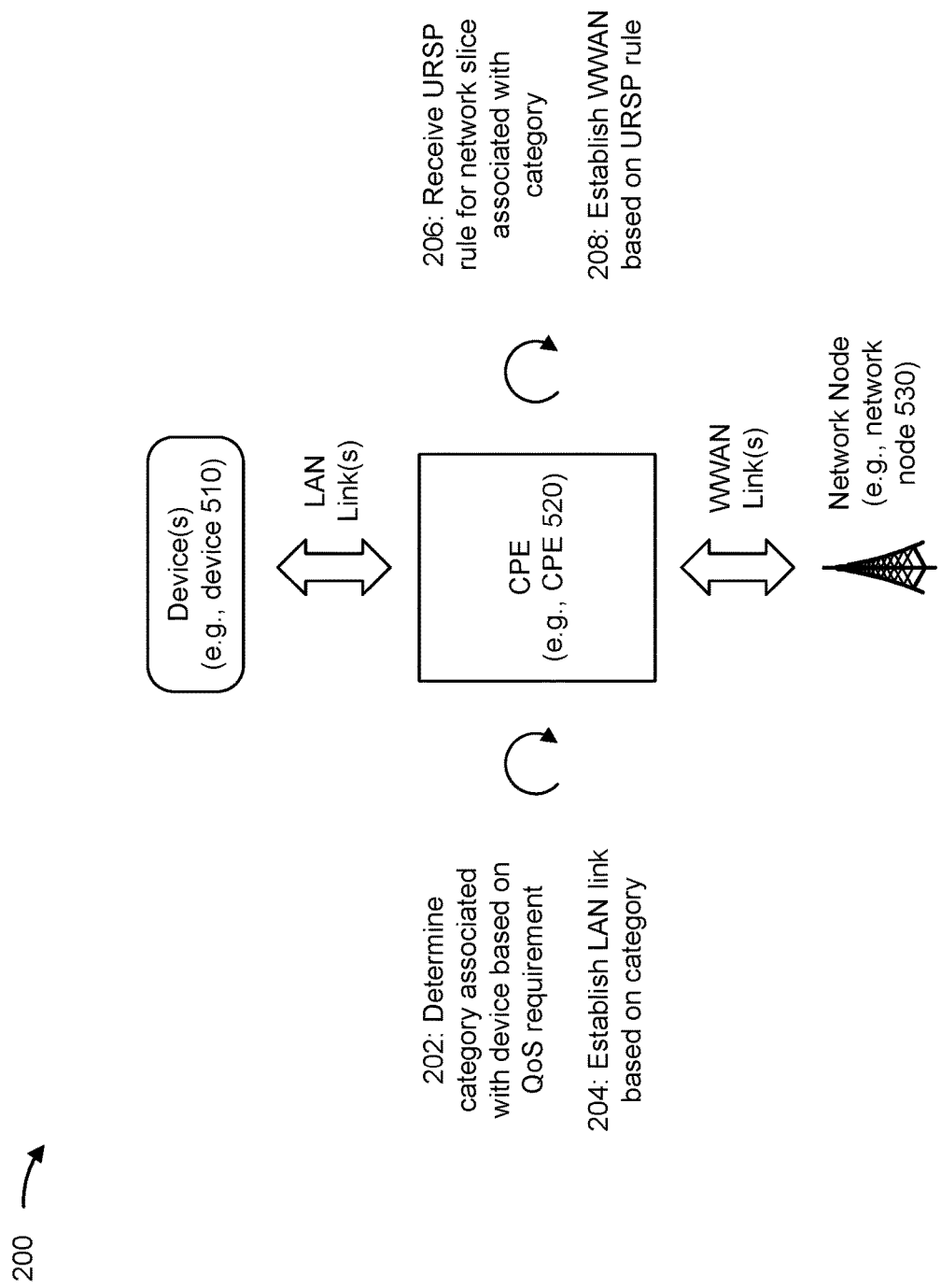
FIG. 2 is a diagram of an example associated with establishing LAN links for devices based on QoS.

FIG. 2 is a diagram of an example 200 associated with establishing LAN links for devices based on QoS. As shown in FIG. 2, example 200 includes one or more devices (e.g., device 610), a CPE (e.g., CPE 620), and a network node (e.g., network node 630). The CPE may be a fixed wireless CPE endpoint.

As shown by reference number 202, the CPE may determine a category associated with a device in a LAN, such as a WiFi network. The WiFi network may be a network that uses a wireless network protocol based on Institute of Electrical and Electronics Engineers (IEEE) 802.11. The category may be based on a QoS requirement associated with the device. The CPE may determine the category associated with the device based on an indication of the category received from an application running on the device in the LAN, or based on an indication of the category received from an application associated with another device in the LAN. The CPE may determine the category associated with the device based on a keyword analysis of information associated with the device, where the information may be obtained based on a banner grabbing or another appropriate technique. The CPE may determine the category associated with the device based on a user input. For example, a user interface may allow a user to provide the user input, where the user input may be related to the category associated with the device.

In some implementations, the device may request, from a service provider, a fixed wireless service. The device may download an application associated with configuring a QoS management for the LAN. The application may be associated with a service categorization. The device may scan the LAN and identify different devices and/or applications associated with the LAN. The different devices may include a gaming device, a smart television, and/or an IoT device. The different applications may run on one or more of the different devices. The device may provide an interface, via the application, that allows a user associated with the device to select categories for the different devices and/or applications based on service needs. In other words, depending on QoS requirements associated with the different devices and/or applications, specific categories may be selected. The categories may include latency sensitivity, high speed, best effort, or a combination of different categories.

Figure 3:
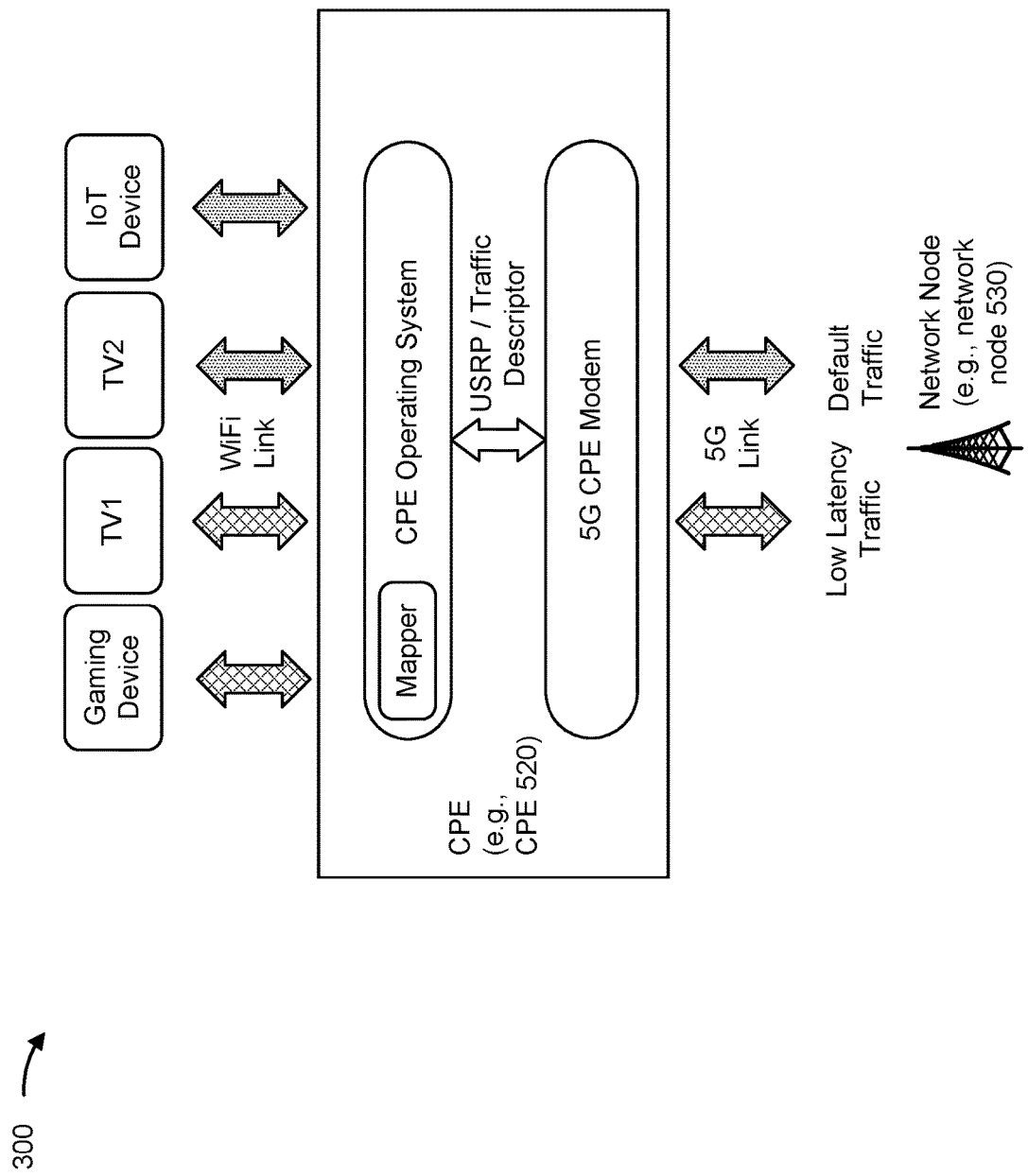
FIG. 3 is a diagram of an example associated with establishing LAN links for devices based on QoS.

As shown by reference number 204, the CPE may establish a LAN link (e.g., WiFi link) with the device based on the category. The LAN link may be based on the QoS requirement associated with the device. The LAN link may be between the device and the CPE within the LAN. In some implementations, different LAN links may be associated with different devices in the LAN, respectively, and the different LAN links may be based on different QoS requirements associated with the different devices, respectively. An example of different LAN links associated with different QoS requirements (e.g., low latency versus default) is shown in FIG. 3.

In some implementations, the CPE may maintain and store a table associated with a WWAN and LAN priority mapping (e.g., a 5G and WiFi priority mapping) at a device level. The table may indicate, for the device, a device Internet Protocol (IP) address, a device media access control (MAC) address, a LAN received signal strength indicator (RSSI) (e.g., WiFi RSSI), the category, a mapping to a URSP rule, a mapping to a LAN QOS access category (e.g., WiFi QoS access category), and/or or a LAN multimedia user priority (e.g., WiFi multimedia (WMM) user priority). The category may be associated with latency sensitivity and the URSP rule may be for a low latency network slice. The category may be associated with speed and the URSP rule may be for a high speed network slice. The category may be associated with effort and the URSP rule may be for a default network slice. The category may be associated with multiple categories and the URSP rule may be for the default network slice.

In some implementations, the table may indicate one or more device types (e.g., gaming console, smart television, IoT device, and phone/tablet). Each device may be associated with the device IP address, the device MAC address, the LAN RSSI, the category (e.g., latency sensitivity, high speed, best effort, and/or multiple categories), a mapping to a network priority (e.g., a Third Generation Partnership Project (3GPP) priority) that is associated with the mapping to the URSP rule, the mapping to the LAN QOS access category, and the LAN multimedia user priority. An example of a CPE internal table for the 5G and WiFi priority mapping at the device level is shown in FIG. 5.

As shown by reference number 206, the CPE may receive the URSP rule for the network slice associated with the category. The CPE may download the URSP rule from a network server. The URSP rule may indicate information mapping certain user traffic data (e.g., applications) to 5G protocol data unit (PDU) session connectivity parameters. The user data traffic may be defined in the URSP rule by a traffic descriptor parameter. The CPE may use the URSP rule to initiate a QoS flow for different devices and/or applications. An example of the CPE receiving the URSP rule is further shown in FIG. 4.

As shown by reference number 208, the CPE may establish a WWAN link (e.g., a 5G link) to the network node based on the URSP rule. The WWAN link may be based on the network slice and a 5QFI associated with the category. The WWAN link may be a 5G wireless network link. The WWAN link may be associated with a WWAN, such as a 5G network. The 5QFI may be associated with low latency traffic or default traffic, depending on the category associated with the device. A customized QoS per device may be supported at both the LAN link and the WWAN link.

In some implementations, the network slice may be a first network slice. The CPE may receive, from the network node, a function associated with a traffic flow classification. The CPE may establish traffic for the device based on the first network slice. The CPE may determine metrics associated with the traffic. The metrics may include a latency, a jitter, a packet size, and/or an arrival time associated with the traffic. The CPE may determine, using the function, a classification of the traffic based on the metrics associated with the traffic. The CPE may trigger an update to request a second network slice based on the classification of the traffic. An adaptive LAN QOS (e.g., WiFi QoS) may be based on the classification of the traffic.

In some implementations, an adaptive LAN QOS may be based on the classification of the traffic by the CPE. The device (e.g., a smart phone) may be set as a multiple category device, which may be indicated in a table maintained by the CPE. A gaming application may be initiated on the device. When a DSCP or an MSCS is enabled on the gaming application, then traffic may be prioritized using a latency sensitivity category and a URSP rule for a low latency slice. For example, when the DSCP or the MSCS are enabled on the gaming application, then the traffic may be prioritized using AC_VO user priority (6 or 7). Otherwise, priority 0 may be allocated on a LAN side. A packet data network (PDN) may be set up with a default network slice (e.g., a default 5G slice). The CPE may collect various types of data for traffic. The traffic may include outgoing and incoming traffic flows (e.g., traffic in each direction), where the traffic may be associated with the gaming application. For example, the CPE may collect data regarding latency, jitter, packet size, and/or inter-arrival time for the traffic. The CPE may analyze the data to identify a burstiness associated with the traffic. The CPE may analyze the data to identify a frequency of packets associated with the traffic. The CPE may classify the traffic based on the burstiness and/or the frequency of packets. The CPE may assess the traffic to be in a certain category, which may translate to a certain URSP. For example, the CPE may access the traffic to be in an AC_VO category (e.g., latency sensitivity), which may translate to a URSP for a low latency slice. The CPE may trigger a PDN update to request the low latency slice, and packets may be prioritized within the LAN based on the AC_VO priority. In this example, depending on the traffic, the CPE may request a change from the default network slice to the low latency slice, thereby enabling the adaptive WWAN QoS based on the traffic classification.

In some implementations, in a traffic flow mapping, a 5G core (5GC) may implement the function, where the function may perform a traffic flow classification based on an artificial intelligence (AI) and/or machine learning (ML) system using network IP traces as a training set. The 5GC may output, to the CPE, a table with a traffic flow classification mapped to a set of parameter thresholds. For example, the 5GC may output a table that indicates respective ranges for packet size, inter-arrival time, and/or jitter related to a low delay sensitivity traffic flow. The 5GC may push the table to the CPE via Open Mobile Alliance Device Management (OMA-DM). The CPE may store the table in a local memory. In some implementations, when a device associated with multiple categories initiates traffic from an application that runs on the device, the CPE may set up the traffic with a default slice at a LAN side and at a WWAN side (e.g., 3GPP side). The CPE may calculate a value for each parameter given in an OMA-DM pushed table. In other words, the CPE may calculate a value for each parameter (e.g., packet size, inter-arrival time, and/or jitter) indicated in the table received from the 5GC. When values are within a range for a low delay sensitivity traffic flow, the CPE may continue the traffic flow with a default QoS. When values are outside of the range for the low delay sensitivity traffic flow, the CPE may request and/or set up a slice with an upgraded QoS at the LAN side and at the WWAN side.

In some implementations, the CPE may establish traffic for the device based on the network slice, where the traffic may be associated with the application that runs on the device. The CPE may determine a jitter associated with the traffic. The CPE may determine a latency associated with the traffic. The CPE may determine an RSSI associated with the traffic. The CPE may map the traffic to the LAN QOS access category based on the jitter, the latency, and the RSSI associated with the traffic.

In some implementations, the adaptive LAN QoS may be based on traffic classification in the WWAN (e.g., the 5G network). An operator associated with the WWAN may enhance and/or monetize an experience of the application irrespective of which tethered device the application is running on. For example, a gaming application may be running on a smart phone, a console, or a smart television. The CPE may have a measure of baseline latency and jitter for different traffic flows, which may be continually updated by the CPE. For each traffic flow, the CPE may analyze a moving average of latency and/or jitter. When a measured jitter is less than a baseline jitter minus a threshold jitter, a measured latency is less than a baseline latency minus a threshold latency, and an RSSI is less than an RSSI threshold, the CPE may remap that traffic flow to latency sensitivity (e.g., AC_VO) on the LAN side, which may provide an upgraded experience. When the measured jitter is not less than the baseline jitter minus the threshold jitter, or when the measured latency is not less than the baseline latency minus the threshold latency, the CPE may remap that traffic flow to best effort (e.g., AC_BE) on the LAN side. In one example, the baseline latency may be set to about 40 ms, the threshold latency may be set to about 10 ms, the baseline jitter may be set to about 10 ms, and the threshold jitter may be set to about 3 ms. In some implementations, when new traffic flows are created by the WWAN, the CPE may compare a measured jitter, a measured latency, and an RSSI to respective thresholds, and may then determine whether the new traffic flows should be remapped. The CPE may receive an indication of the respective thresholds from the 5G network.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIG. 3 is a diagram of an example 300 associated with establishing LAN links for devices based on QoS. As shown in FIG. 3, example 300 includes one or more devices (e.g., device 610), a CPE (e.g., CPE 620), and a network node (e.g., network node 630).

As shown in FIG. 3, the CPE may communicate with the plurality of devices within a LAN. The plurality of devices may communicate with the CPE via respective WiFi links. The CPE may include a CPE operating system and a 5G CPE modem. The 5G CPE modem may establish one or more 5G links with the network node. The one or more 5G links may be for different types of traffic, such as low latency traffic and/or default traffic.

In some implementations, the plurality of devices may each be associated with a different QoS by the CPE in the LAN, which may be based on the different devices being associated with different QoS requirements. For example, the WiFi links for the gaming device and the first smart television may be associated with a first QoS, which may be based on the gaming device and the first smart television being associated with the low latency traffic. The WiFi links for the second smart television and the IoT device may be associated with a second QoS, which may be based on the second smart television and the IoT device being associated with the default traffic. Each of the devices may be treated uniquely in terms of the QoS management by the CPE. A performance associated with the gaming device and the first smart television, which are associated with the low latency traffic, may be optimized via the WiFi links associated with the gaming device and the first smart television. A performance associated with the second smart television and the IoT device, which are associated with the default traffic, may be optimized via the WiFi links associated with the second smart television and the IoT device. As a result, a customized QoS per device may be supported at both the WiFi links and the 5G links.

In some implementations, the CPE OS running on the CPE may include a mapper function. The mapper function may create a table indicating a 5G and WiFi priority mapping at a device level. The table may indicate one or more device types (e.g., gaming console, smart television, IoT device, and phone/tablet). Each device may be associated with a device IP address, a device MAC address, a WiFi RSSI, a category (e.g., latency sensitivity, high speed, best effort, and/or multiple categories), a mapping to a network priority (e.g., a 3GPP priority), a mapping to a WiFi QoS access category, and a WMM user priority.

In some implementations, the CPE may download a URSP or traffic descriptor from a server (e.g., a network server). The 5G CPE modem may use the URSP or traffic descriptor to initiate QoS flows for the low latency traffic and the default traffic.

As indicated above, FIG. 3 is provided as an example. Other examples may differ from what is described with regard to FIG. 3.

Figure 4:
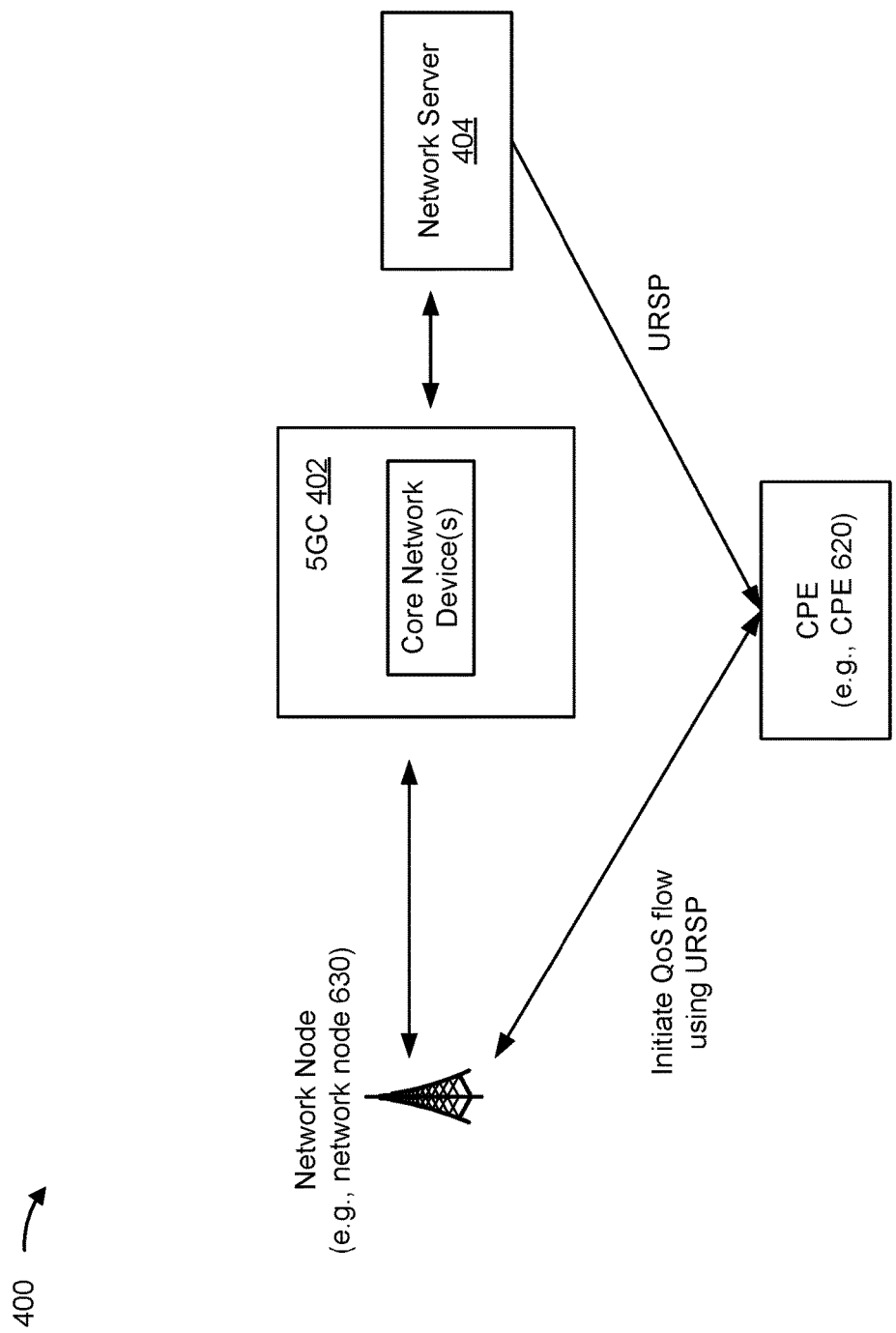
FIG. 4 is a diagram of an example associated with establishing LAN links for devices based on QoS.

FIG. 4 is a diagram of an example 400 associated with establishing LAN links for devices based on QoS.

As shown in FIG. 4, a 5GC 402 may include core network devices, such as an access and mobility management function (AMF), a policy control function (PCF), and a unified data repository (UDR). A network node (e.g., network node 630) may be associated with a radio access network (RAN) or some other type of access network, which may enable the network node to communicate with the 5GC 402. A network server 404 may be external to the 5GC 402. A CPE associated with a LAN may download a URSP from the network server 404. The URSP may include information mapping certain user traffic data (e.g., applications) to 5G PDU session connectivity parameters. The user data traffic may be defined in a URSP rule by a traffic descriptor parameter. The CPE may use the URSP to initiate a QoS flow for different devices and/or applications. The CPE may initiate the QoS flow with the network node.

As indicated above, FIG. 4 is provided as an example. Other examples may differ from what is described with regard to FIG. 4.

FIG. 5 is a table 500 for a 5G and WiFi priority mapping at a device level.

As shown in FIG. 5, in a CPE internal table for a 5G and WiFi priority mapping at a device level, a gaming console may be associated with a device IP address of 10.0.0.3, a device MAC address of xx.xx.xx.xx, a WiFi RSSI of −87 decibel-milliwatts (dBm), a category of latency sensitivity, a 3GPP priority associated with a URSP rule for a low latency slice, a WiFi QoS access category of AC_VO, and a WMM user priority of 7. A smart television may be associated with a device IP address of 10.0.0.4, a device MAC address of xx.xx.xx.xx, a WiFi RSSI of xx dBm, a category of high speed, a 3GPP priority associated with a URSP rule for a high speed slice, a WiFi QoS access category of AC_VI, and a WMM user priority of 5. An IoT device may be associated with a device IP address of x.x.x.x, a device MAC address of xx.xx.xx.xx, a WiFi RSSI of xx dBm, a category of best effort, a 3GPP priority associated with a URSP rule for a default slice, a WiFi QoS access category of AC_BE, and a WMM user priority of 1. A phone or tablet may be associated with a device IP address of x.x.x.x, a device MAC address of xx.xx.xx.xx, a WiFi RSSI of xx dBm, multiple categories, and a 3GPP priority associated with a URSP rule for a default slice. For multiple category devices, an initial 3GPP QoS rule may be set to default, and then a dynamic update of QoS may be performed based on a traffic classification mechanism. Further, for the phone or tablet, the mapping to the WiFi QoS access category and the WMM priority may depend on a differentiated services code point (DSCP) priority field or a mirrored stream classification service (MSCS). MSCS may enable a client device to request an access point to apply specific QoS treatment of downlink IP flows using QoS mirroring.

As indicated above, FIG. 5 is provided as an example. Other examples may differ from what is described with regard to FIG. 5.

Figure 6:
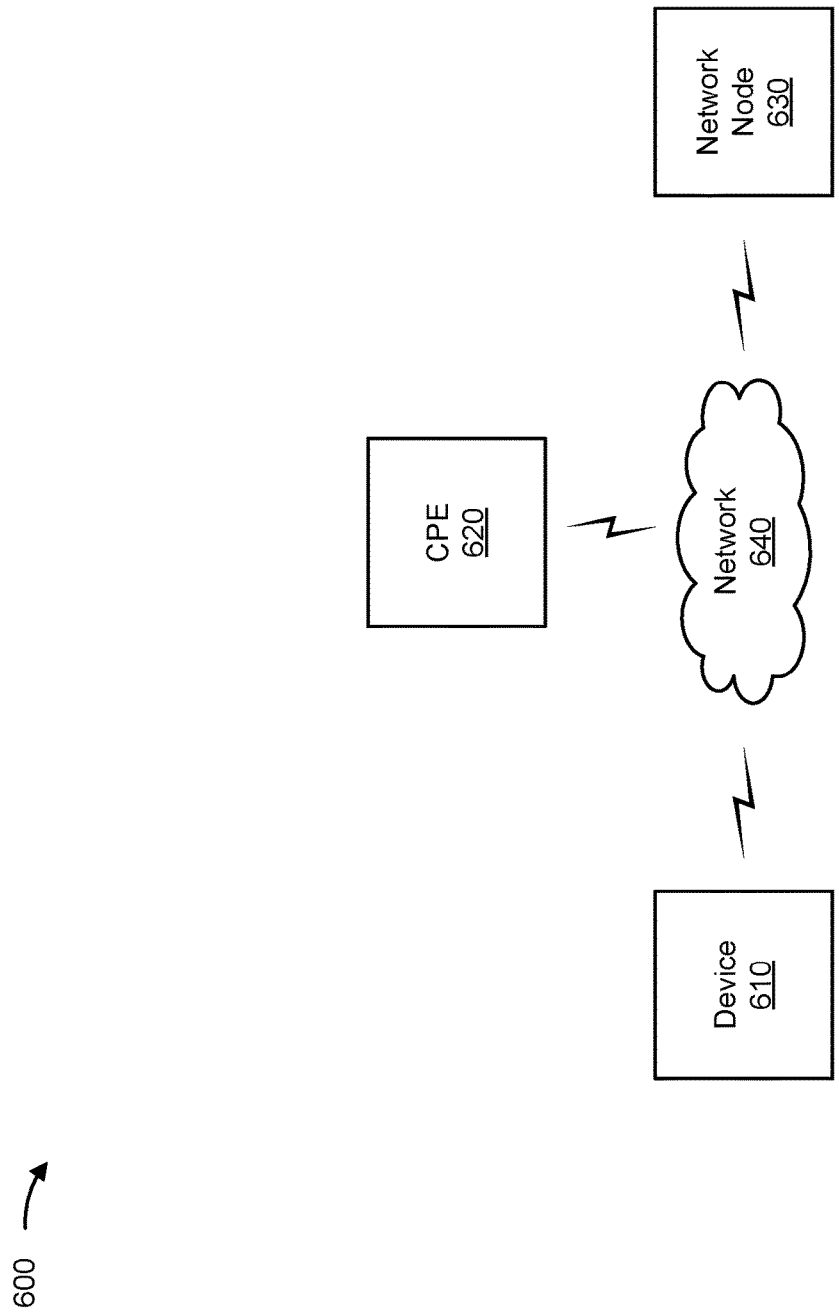
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a device 610, a CPE device 620, a network node device 630, and a network 640. Devices of environment 600 may interconnect via wired connections, wireless connections, or a combination of wired and wireless connections.

The device 610 may include one or more devices capable of receiving, generating, storing, processing, and/or providing information associated with establishing LAN links for devices based on QoS, as described elsewhere herein. The device 610 may include a communication device and/or a computing device. For example, the device 610 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a smart television, an IoT device, or a similar type of device.

The CPE 620 may include one or more devices capable of receiving, processing, storing, routing, and/or providing traffic (e.g., a packet and/or other information or metadata) in a manner described herein. For example, the CPE 620 may include a router, such as a label switching router (LSR), a label edge router (LER), an ingress router, an egress router, a provider router (e.g., a provider edge router or a provider core router), a virtual router, or another type of router. Additionally, or alternatively, the CPE 620 may include a gateway, a switch, a firewall, a hub, a bridge, and/or a similar device. In some implementations, the CPE 620 may be a physical device implemented within a housing, such as a chassis.

The network node 630 may include one or more devices capable of receiving, processing, storing, routing, and/or providing information associated with establishing LAN links for devices based on QoS, as described elsewhere herein. The network node 630 may be configured to communicate with the device 610 via the CPE 620. The network node 630 may be an aggregated network node, meaning that the aggregated network node is configured to utilize a radio protocol stack that is physically or logically integrated within a single RAN node (e.g., within a single device or unit). The network node 630 may be a disaggregated network node (sometimes referred to as a disaggregated base station), meaning that the network node 630 is configured to utilize a protocol stack that is physically or logically distributed among two or more nodes (such as one or more central units (CUs), one or more distributed units (DUs), or one or more radio units (RUS)). The network node 630 may include, for example, an NR base station, a long-term evolution (LTE) base station, a Node B, an eNB (e.g., in 4G), a gNB (e.g., in 6G), an access point, a transmission reception point (TRP), a DU, an RU, a CU, a mobility element of a network, a core network node, a network element, a network equipment, and/or a RAN node.

The network 640 may include one or more wired and/or wireless networks. For example, the network 640 may include a cellular network (e.g., a 6G network, a fourth generation (4G) network, a long-term evolution (LTE) network, a third generation (3G) network, a code division multiple access (CDMA) network, etc.), a public land mobile network (PLMN), a LAN, a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 640 enables communication among the devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
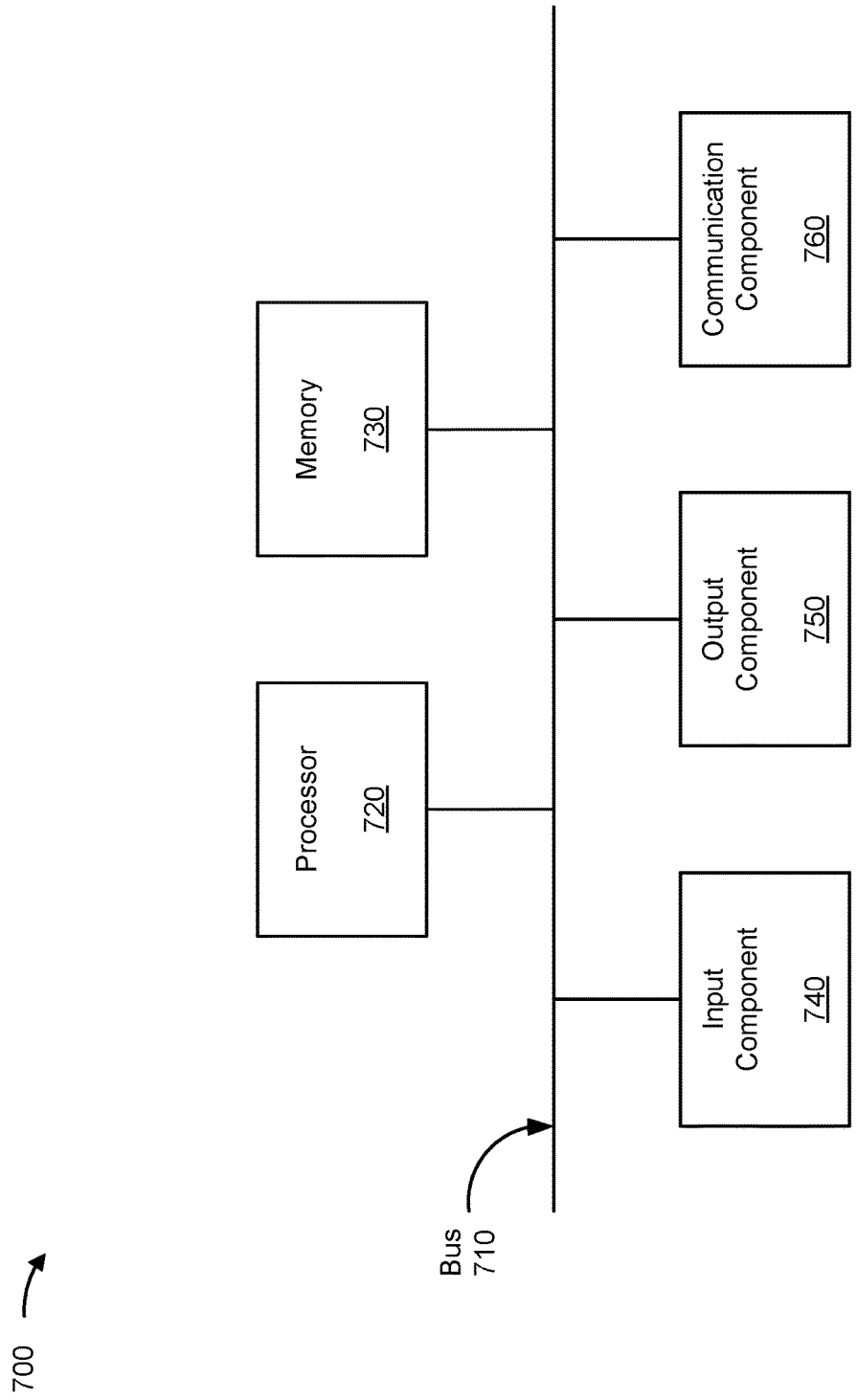
FIG. 7 is a diagram of example components of one or more devices of FIG. 6.

FIG. 7 is a diagram of example components of a device 700 associated with establishing LAN links for devices based on QoS. The device 700 may correspond to device 610, CPE 620, and/or network node 630. In some implementations, device 610, CPE 620, and/or network node 630 may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
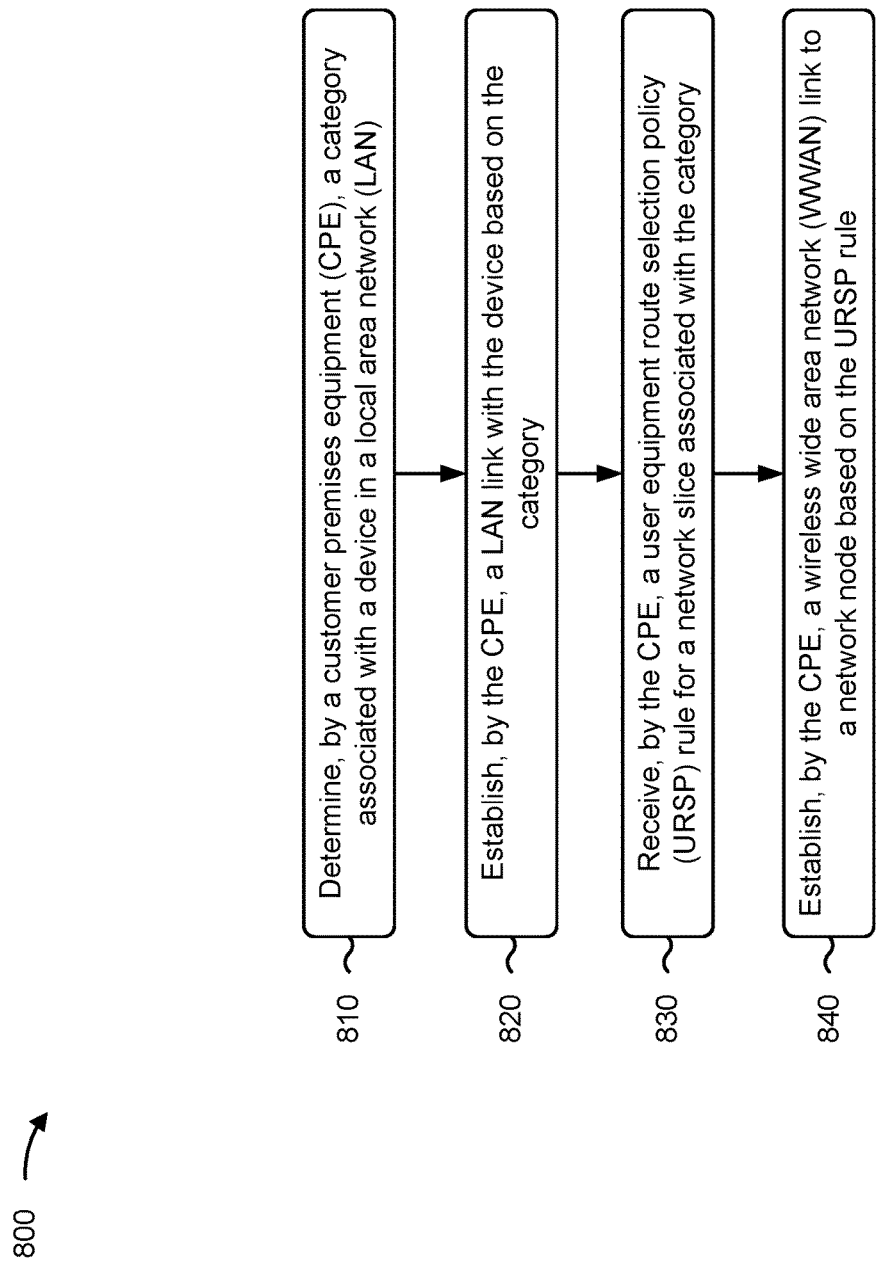
FIG. 8 is a flowchart of an example process associated with establishing LAN links for devices based on QoS.

FIG. 8 is a flowchart of an example process 800 associated with establishing LAN links for devices based on QoS. In some implementations, one or more process blocks of FIG. 8 may be performed by a CPE (e.g., CPE 620). In some implementations, one or more process blocks of FIG. 8 may be performed by another device or a group of devices separate from or including the CPE, such as a device (e.g., device 610) and/or a network node (e.g., network node 630). Additionally, or alternatively, one or more process blocks of FIG. 8 may be performed by one or more components of device 700, such as processor 720, memory 730, input component 740, output component 750, and/or communication component 760.

As shown in FIG. 8, process 800 may include determining a category associated with a device in a LAN, wherein the category is based on a QoS requirement associated with the device (block 810). In some implementations, the CPE may determine the category associated with the device based on an indication of the category received from an application running on the device in the LAN, or an application associated with another device in the LAN. In some implementations, the CPE may determine the category associated with the device based on a keyword analysis of information associated with the device. The CPE may obtain the information associated with the device via a banner grabbing. The CPE may obtain the information associated with the device based on a request sent to the device. The CPE may obtain the information associated with the device during an initial signaling exchange with the device (e.g., when the device connects to the CPE).

As further shown in FIG. 8, process 800 may include establishing a LAN link with the device based on the category (block 820). The LAN link may be based on a QoS requirement associated with the device. The LAN link may be between the device and the CPE within the LAN.

As further shown in FIG. 8, process 800 may include receiving a URSP rule for a network slice associated with the category (block 830). The CPE may receive the URSP rule from a network server or from another network entity. The URSP rule may indicate information mapping certain user traffic data (e.g., applications) to 5G PDU session connectivity parameters. The user data traffic may be defined in the URSP rule by a traffic descriptor parameter.

As further shown in FIG. 8, process 800 may include establishing a WWAN link to a network node based on the URSP rule, wherein the WWAN link is based on the network slice and a QoS flow identifier associated with the category (block 840). The CPE may use the URSP rule to initiate a QoS flow for different devices and/or applications. The WWAN link may be a 5G wireless network link, an LTE wireless network link, a sixth generation (6G) wireless network link, or another suitable type of wireless network link. The QoS flow identifier may be associated with low latency traffic or default traffic.

In some implementations, process 800 includes maintaining and storing, by the CPE, a table associated with a WWAN and LAN priority mapping at a device level, where the table indicates, for the device, one or more of a device IP address, a device MAC address, a LAN RSSI, the category, a mapping to the URSP rule, a mapping to a LAN QOS access category, or a LAN multimedia user priority. The category may be associated with latency sensitivity and the URSP rule is for a low latency network slice, the category may be associated with speed and the URSP rule is for a high speed network slice, the category may be associated with effort and the URSP rule is for a default network slice, or the category may be associated with multiple categories and the URSP rule is for the default network slice.

In some implementations, different LAN links may be associated with different devices in the LAN, respectively, and the different LAN links may be based on different QoS requirements associated with the different devices, respectively. In some implementations, a customized QoS per device may be supported at both the LAN link and the WWAN link.

In some implementations, the network slice may be a first network slice, and process 800 may include receiving, from a network node, a function associated with a traffic flow classification, establishing traffic for the device based on the first network slice, determining metrics associated with the traffic, wherein the metrics include one or more of latency, jitter, packet size, or arrival time associated with the traffic, determining, using the function, a classification of the traffic based on the metrics associated with the traffic, and triggering an update to request a second network slice based on the classification of the traffic. An adaptive LAN QOS may be based on the classification of the traffic.

In some implementations, process 800 includes establishing traffic for the device based on the network slice, wherein the traffic is associated with an application that runs on the device, determining a jitter associated with the traffic, determining a latency associated with the traffic, determining an RSSI associated with the traffic, and mapping the traffic to a LAN QOS access category based on the jitter, the latency, and the RSSI associated with the traffic.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a customer premises equipment (CPE), a category associated with a device in a local area network (LAN), wherein the category is based on a quality of service (QOS) requirement associated with the device;
   establishing, by the CPE, a LAN link with the device based on the category;
   receiving, by the CPE, a user equipment route selection policy (URSP) rule for a network slice associated with the category; and
   establishing, by the CPE, a wireless wide area network (WWAN) link to a network node based on the URSP rule, wherein the WWAN link is based on the network slice and a QoS flow identifier associated with the category.

2. The method of claim 1, wherein determining the category associated with the device is based on an indication of the category received from an application running on the device in the LAN or an application associated with another device in the LAN.

3. The method of claim 1, wherein determining the category associated with the device is based on a keyword analysis of information associated with the device.

4. The method of claim 1, wherein the WWAN link is a fifth generation (5G) wireless network link.

5. The method of claim 1, further comprising:
   maintaining and storing, by the CPE, a table associated with a WWAN and LAN priority mapping at a device level, wherein the table indicates, for the device, one or more of
      a device Internet Protocol address,
         a device media access control (MAC) address,
            a LAN received signal strength indicator (RSSI),
               the category,
               a mapping to the URSP rule,
               a mapping to a LAN QOS access category,
               or
               a LAN multimedia user priority.

6. The method of claim 5, wherein:
   the category is associated with at least one of the following:
      a latency sensitivity and the URSP rule is for a low latency network slice;
      a speed and the URSP rule is for a high speed network slice;
      an effort and the URSP rule is for a default network slice; or
      multiple categories and the URSP rule is for the default network slice.

7. The method of claim 1, wherein determining the category associated with the device is based on a user input.

8. The method of claim 1, wherein different LAN links are associated with different devices in the LAN, respectively, and wherein the different LAN links are based on different QOS requirements associated with the different devices, respectively.

9. The method of claim 1, wherein a customized QoS per device is supported at both the LAN link and the WWAN link.

10. The method of claim 1, wherein the network slice is a first network slice, and further comprising:
receiving, by the CPE and from the network node, a function associated with a traffic flow classification;
establishing traffic for the device based on the first network slice;
determining metrics associated with the traffic, wherein the metrics include one or more of latency, jitter, packet size, or arrival time associated with the traffic;
determining, using the function, a classification of the traffic based on the metrics associated with the traffic; and
triggering an update to request a second network slice based on the classification of the traffic.

11. The method of claim 10, wherein an adaptive LAN QOS is based on the classification of the traffic.

12. The method of claim 1, further comprising:
establishing traffic for the device based on the network slice, wherein the traffic is associated with an application that runs on the device;
determining one or more of a jitter associated with the traffic, a latency associated with the traffic, or a received signal strength indicator (RSSI) associated with the traffic; and
mapping the traffic to a LAN QOS access category based on one or more of the jitter, the latency, or the RSSI associated with the traffic.

13. A first device, comprising:
one or more processors configured to:
determine a category associated with a second device in a local area network (LAN), wherein the category is based on a quality of service (QOS) requirement associated with the second device;
establish a LAN link with the second device based on the category;
receive a user equipment route selection policy (URSP) rule for a network slice associated with the category; and
establish a wireless wide area network (WWAN) link to a network node based on the URSP rule, wherein the WWAN link is based on the network slice and a QoS flow identifier associated with the category.

14. The first device of claim 13, wherein the one or more processors are further configured to:
maintain and store a table associated with a WWAN and LAN priority mapping at a device level, wherein the table indicates, for the second device, one or more of a device Internet Protocol address, a device media access control (MAC) address, a LAN received signal strength indicator (RSSI), the category, a mapping to the URSP rule, a mapping to a LAN QOS access category, or a LAN multimedia user priority.

15. The first device of claim 14, wherein:
the category is associated with at least one of the following:
a latency sensitivity and the URSP rule is for a low latency network slice;
a speed and the URSP rule is for a high speed network slice;
an effort and the URSP rule is for a default network slice; or
multiple categories and the URSP rule is for the default network slice.

16. The first device of claim 13, wherein the first device is a fixed wireless customer premises equipment (CPE) endpoint.

17. A non-transitory computer-readable medium storing a set of instructions, the set of instructions comprising:
one or more instructions that, when executed by one or more processors of a first device, cause the first device to:
determine a category associated with a second device in a local area network (LAN), wherein the category is based on a quality of service (QOS) requirement associated with the second device;
establish a LAN link with the second device based on the category;
receive a user equipment route selection policy (URSP) rule for a network slice associated with the category; and
establish a wireless wide area network (WWAN) link to a network node based on the URSP rule, wherein the WWAN link is based on the network slice and a QoS flow identifier associated with the category.

18. The non-transitory computer-readable medium of claim 17, wherein the network slice is a first network slice, and wherein the one or more instructions, when executed by the one or more processors, further cause the first device to:
receive a function associated with a traffic flow classification;
establish traffic for the second device based on the first network slice;
determine metrics associated with the traffic, wherein the metrics include one or more of latency, jitter, packet size, or arrival time associated with the traffic;
determine, using the function, a classification of the traffic based on the metrics associated with the traffic; and
trigger an update to request a second network slice based on the classification of the traffic.

19. The non-transitory computer-readable medium of claim 17, wherein the one or more instructions, when executed by the one or more processors, further cause the first device to:
establish traffic for the second device based on the network slice, wherein the traffic is associated with an application that runs on the second device;
determine one or more of a jitter associated with the traffic, a latency associated with the traffic, or a received signal strength indicator (RSSI) associated with the traffic; and
map the traffic to a LAN QOS access category based on one or more of the jitter, the latency, or the RSSI associated with the traffic.

20. The non-transitory computer-readable medium of claim 17, wherein the first device is a fixed wireless customer premises equipment (CPE) endpoint.

* * * * *